(12) United States Patent
Kinoshita

(10) Patent No.: US 6,323,572 B1
(45) Date of Patent: Nov. 27, 2001

(54) MAGNET TYPE ELECTRIC MOTOR AND GENERATOR

(76) Inventor: Yukio Kinoshita, 7-8, Mikanohara-cho 2-chome, Hitachi-shi, Ibaraki 316-0026 (JP)

( * ) Notice: Subject to any disclaimer, the term of this patent is extended or adjusted under 35 U.S.C. 154(b) by 0 days.

(21) Appl. No.: 09/441,557

(22) Filed: Nov. 17, 1999

(30) Foreign Application Priority Data

Nov. 17, 1998 (JP) .................................................. 10-342312

(51) Int. Cl.⁷ .................................................. H02K 21/12
(52) U.S. Cl. .............................. 310/156.07; 310/156.55; 310/156.64
(58) Field of Search .................................... 310/156, 216, 310/217, 218, 261, 264, 156.01, 156.02, 156.03, 156.07, 156.48, 156.49, 156.55, 156.56, 156.63, 156.64, 156.65

(56) References Cited

U.S. PATENT DOCUMENTS

| | | | |
|---|---|---|---|
| 4,405,873 | * | 9/1983 | Nondahl .............................. 310/156 |
| 4,618,792 | * | 10/1986 | Yates .................................. 310/156 |
| 5,371,426 | * | 12/1994 | Nagate et al. ...................... 310/156 |
| 5,955,807 | * | 9/1999 | Kajiura et al. ...................... 310/156 |
| 6,025,667 | * | 2/2000 | Narita et al. ....................... 310/156 |
| 6,037,691 | * | 3/2000 | Akemakou ......................... 310/191 |

* cited by examiner

Primary Examiner—Nestor Ramirez
Assistant Examiner—Dang Dinh Le
(74) Attorney, Agent, or Firm—Antonelli, Terry, Stout & Kraus, LLP

(57) ABSTRACT

To obtain the magnetic flux increase of the air gap, a radial slit for inserting a magnet is provided in a respective pole iron core, and the length of the magnet is adjusted to a radial direction and to an axial direction. In particular, when it is desired to strengthen the magnetic flux, a strong magnetic flux magnet and a magnet which is inserted fully into the slit are used. Further, forming an attachment and detachment structure, it is possible to carry out easily the alternation and the adjustment of the characteristics of a magnet type electric motor and a generator.

7 Claims, 6 Drawing Sheets

MAGNET TYPE ELECTRIC MOTOR AND GENERATOR

BACKGROUND OF THE INVENTION

The present invention relates to a magnet type electric motor and generator and in particular to in a magnet type electric motor and generator a magnetic pole structure is constituted to obtain an output improvement, an output adjustment and an efficiency improvement, etc, of the magnet type electric motor and generator.

Up to now, in a conventional magnet type electric motor and generator, a magnet arrangement is a cylindrical shape, or magnets are formed by magnetizing a disc-like shape material, or separation magnets are used by arranging with a circumferential shape. Accordingly, the magnetic field of an air gap formed between a rotor and a stator is influenced by the magnetic force of the magnet and, as a result an output and an efficiency of the magnet type electric motor and generator are determined naturally.

Recently, under a resource saving and an energy saving, it is desired strongly a high efficiency and a resource saving in the magnet type electric motor and generator technical field but there is not appear a satisfied technique up to now. Further, there is a problem that a strong magnetic flux magnet, for example, which is exemplified by a neodymium magnet, is performed recently before the footlights and such a magnet is very high cost in comparison with a ferrite magnet and has a limitation for the purpose aspect and at the same time has a limitation for the resource aspect.

Accordingly, in the present invention, it has paid to an attention in which an improvement in the magnetic flux density of an air gap portion formed between a rotor and a stator in the magnet type electric motor and generator relates directly to the performance improvement.

SUMMARY OF THE INVENTION

The objects of the present invention are to solve the problems in a magnet type electric motor and generator, which are (1) an arrangement of magnets for increasing the magnetic flux of an air gap, (2) a concentration of the magnetic flux to an air gap, and (3) a shape and a productivity of an iron core structure, etc.

The means for solving the problems to attain the above stated objects of the present invention will be explained in order.

(1) The Arrangement of the Magnet for Increasing the Magnetic Flux of the Air Gap To attain the magnetic flux increase of the air gap, there are one case in which it is carried out using a single magnet every magnetic pole and another case in which it is carried out by combining plural magnets every magnetic pole.

First of all, the case of the single magnet will be explained. A radial shape slit for inserting the magnet is provided on a respective iron core, and the magnet can be adjusted in a radial direction, in particular when the magnetic flux is formed to strengthen, a strong magnetic flux magnet or a magnet being fully inserted to the slit in the radial direction is used.

Further, by employing a structure in which the magnet can be attached to and detached from the slit, it is possible to carry out an alternation and an adjustment of the characteristics of the magnetic type electric motor and generator.

Next, in the case of the single magnet, since there are limitations about the structure and the magnetic force, the magnetic force of the air gap is tried to strengthen further, the combination of plural magnets is used every magnetic pole, or a length of the slit to the axial direction is formed longer than a length of an axial direction of the stator (a length of the iron core).

Or it is utilized an empty space enable to put to a practical use, accordingly it is possible to carry out effectively the increase in the magnetic flux of the air gap.

Further, when the empty space has a limitation, a three-dimensional space of the magnetic pole is put effectively to a practical use, and to a whole face or to a part of the face of the three-dimensional space the magnet is arranged organically and the magnetic flux can be concentrated and can be increased to the air gap portion.

(2) The Concentration of the Magnetic Flux to the Air Gap

In a case where the radial shape slit for inserting the magnet is provided on the iron core of the respective magnetic pole, it is possible to carry out that the radial direction length of the slit is formed longer than the circumferential length per one magnetic pole of the air gap portion or it is carry out the length of the iron core for inserting the magnet is formed longer than the axial direction length of the stator, etc., accordingly the magnetic force of the magnet's own can be strengthened.

Namely, it is necessary to form long the axial direction length of the iron core to have the area of the magnetic generation side of the magnet more than ½ (half) against a facing area of the stator to the rotor per one magnetic pole.

To attain above, the iron core of the respective magnetic pole is formed with a complete separate structure or an incomplete structure in which the necessary minimum combination of the iron cores is confined mechanically or the combination is formed using the non-magnetic body etc. Accordingly, it is essential to not leak as soon as possible the magnetic flux except for the air gap. It is one manner in which the constitution members except for the iron core are unified using almost non-magnetic bodies.

(3) The Shape and the Productivity of the Iron Core

In ordinary in a case of a mass production the iron core is generally to comprise an integrated structure. However, to form effectively the concentration of the magnetic flux of the air gap the iron core is formed with the separation structure every the respective magnetic pole. Further, the rotor iron core and the stator iron core, both have different axial direction lengths, are not suited economically for the integration production, it is necessity to employ an individual production according to the separation structure of the iron core.

Further, the magnet insertion iron core has the constant magnetic field and as a material for the iron core a high cost material such as a thin silicon steel plate of the winding iron core is unnecessary but a block material such a thick plate and a cast body can be used, and in the latter case accordingly it is profitable from a cost aspect.

DESCRIPTION OF THE INVENTION

Figure 1A:
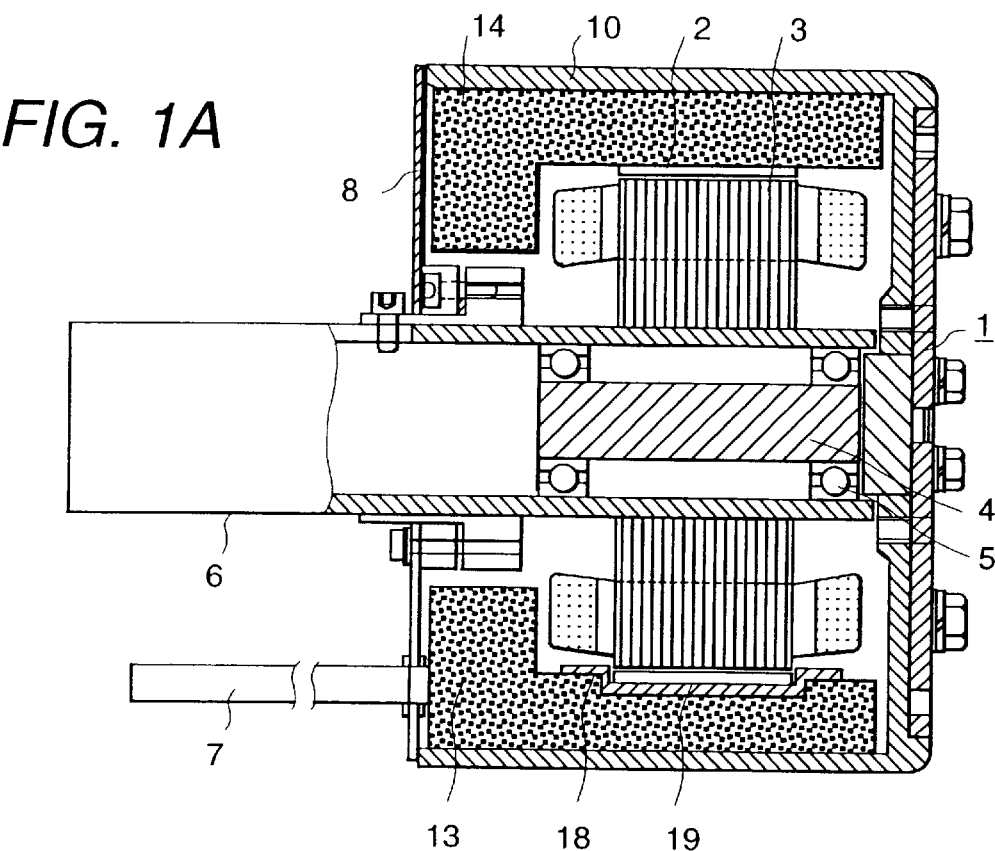
FIG. 1A is a partial cross-sectional view of a magnet type generator in which a magnet is extended to an axial direction of one embodiment according to the present invention.

Hereinafter, an outer rotor and magnet type generator having magnets as a magnet type generator of one embodiment according to the present invention will be explained referring to the drawings.

FIG. 1A shows an outer rotor and magnet type generator and FIG. 1A is a cross-sectional structure view of a magnet type generator having a magnet type rotor portion according to the present invention. On the other hand, FIG. 1B shows a cross-sectional structure view of a conventional magnet type generator having a cylindrical type rotor portion according to the prior art.

Figure 1B:
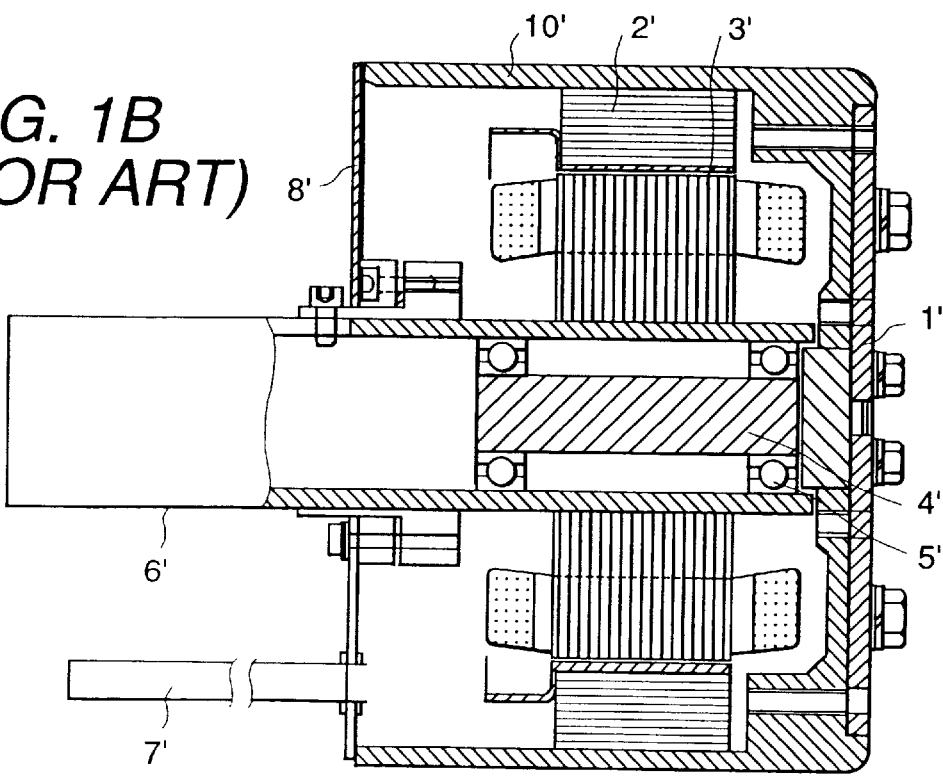
FIG. 1B is a partial cross-sectional view of a magnet type generator in which a magnet is extended to an axial direction according to the prior art.

As shown in FIG. 1B, the conventional magnet type generator 1' comprises a cylindrical type magnet rotor 2', a stator 3', a shaft 4' for driving the rotor 2', bearing members 5' for supporting the shaft 4', a bearing holding pipe 6' to which the bearing members 5' and the shaft 4' are inserted, an electric power supply cord 7', end brackets 8', and an outer frame 10'.

On the other hand, as shown in FIG. 1A, in this embodiment according to the present invention, the magnet type generator 1 comprises a magnet type rotor 2, a stator 3, a shaft 4 for driving the rotor 2, bearing members 5 for supporting the shaft 4, a bearing holding pipe 6 to which the bearing members 5 and the shaft 4 are inserted, an electric power supply cord 7, end brackets 8, an outer frame 10, a division iron core 13, a magnet 14, a side plate 18 and a bar 19.

In this embodiment according to the present invention, when the rotor 2 is driven by a power source from an outside portion, to the coil which is wound to the stator 3, the voltage is generated to proportional to a rotation number and the electric power supply cord (an electricity taken-out cord) 7 when the load such as the resistance load is connected, then the current flows and an electricity power is supplied. The generation voltage of the coil is proportional to the magnetic flux density of the air gap formed between the stator 3 and the rotor 2 and also is proportional to a rotation number.

Paying an attention to a fact in which the heightening of the magnetic flux density of the air gap relates largely to the performance improvement and the efficiency improvement of the magnet type generator 1, the present invention is devised a structure in which the characteristics of the magnet type generator 1 can be improved remarkably.

Further, since the axial direction length of the rotor magnet is lengthened and since an empty space in an interior portion of the magnetic type generator 1 is put to a practical use as possible, and further since a magnet area is formed largely even in a low cost and a weak magnetic flux magnet, without forming an outer diameter of the rotor 2 not very large, similar to the case where the strong magnetic flux magnet is used as an economical structure (about ⅓ size structure) in which the characteristics of the magnet type generator 1 can be improved remarkably.

Next, the improvement idea for increasing the magnetic flux of the air gap in the magnet type generator 1 according to the present invention will be explained referring to FIGS. 2A–2F and FIGS. 3A–3F. Each of FIGS. 2A–2F is an embodiment of the outer rotor and magnet type generator and each of FIGS. 3A–3F is an embodiment of an inner rotor and magnet type generator.

Figure 2A:
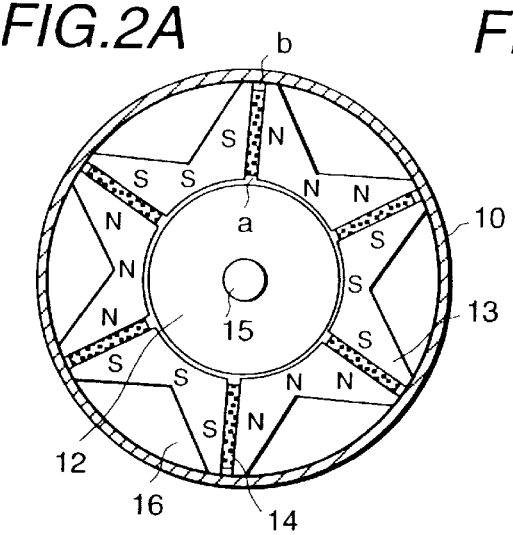
FIGS. 2A–2F are cross-sectional explanation views of a magnet type rotor of an outer rotor and magnet type generator and explanation views of the magnetic flux concentration of the air gaps of six embodiments according to the present invention.

In a cross-sectional view shown in FIG. 2A of the outer rotor and magnet type generator, the rotor portion 2 is constituted by a motive power transmission outer frame 10 of a non-magnetic material rotor 2, six division iron cores 13, and six magnets 14.

In the above stated case, in a case where a portion a of a side of the stator 3 of the magnet 14 and a portion b of a side of the outer frame 10 and a space 16, which is sandwiched by the outer frame 10 and the iron core 13, are constituted by the air or a non-magnetic body (the case of the iron core complete separation structure).

Or even in a case where the above stated portions a, b and the space 16 are compelled to constitute by the iron core 13 and the side plate 18 (a case where it is compelled to constitute by a ferro-magnetic body and a case of the iron core incomplete separation structure) from an aspect of the rotor structure, the magnetic resistance is formed largely to not appear a leakage of the magnetic flux, accordingly the leakage of the magnetic flux from the end portions of the magnet 14 (the portions facing to the stator 3) can be prevented.

Since two times of the length in the radial direction of the magnet 14 is formed longer than the length in a circumferential direction of per one magnetic pole of an air gap portion of the iron core 13, the magnetic flux of the air gap portion can be formed larger than the magnetic flux of the magnet 14.

Further, similarly in a case where the outer diameter of the rotor 2 is not formed large and in a case where the strong air gap magnetic flux is tried to obtain using the weak magnetic flux magnet, the length in the axial direction of the iron core 13 is tried to form long and by utilizing the empty space an effective area of the magnet 14 is formed to larger than an area of the air gap portion, accordingly the magnetic flux concentration effect according to the present invention can be attained and this links to the remarkable performance improvement of the magnet type generator 1.

A polarity of the magnet 14 is formed against one iron core 13 as shown in FIG. 2A to face the same polarity and the magnet 14 is inserted closely attachably to and detachably from the slit, which is formed between two adjacent iron cores 13, to hardly form a gap in the circumferential direction between the iron core 13.

Further, when the gap is formed, to the gap an adjustment plate made of the ferro-magnetic body or the powder like magnetic body (it can employ a liquid like magnetic fluid) is inserted or filled up, accordingly the magnetic resistance can be made small to the utmost.

In this connection, with respect to the difference in performance of the existence of the ferro-magnetic body such as the iron etc. at a portion and b portion in one example of the magnet type generator, there is a data of two times–three times output difference. When the magnet exits, the output is about 600 W and when the magnet does not exist according to the present invention the output is improved to 1800 W. Further, the space 16 works largely a role of the magnetic flux concentration of the magnet type generator.

By the employment of the attachment and detachment structure of the magnet according to the present invention, the magnet having the same magnetic force is changed the length in the radial direction and the magnet having the same length is changed the magnetic force and the length in the radial direction, accordingly the alternation and adjustment in the characteristics of the magnet type generator can be performed easily.

Figure 2D:
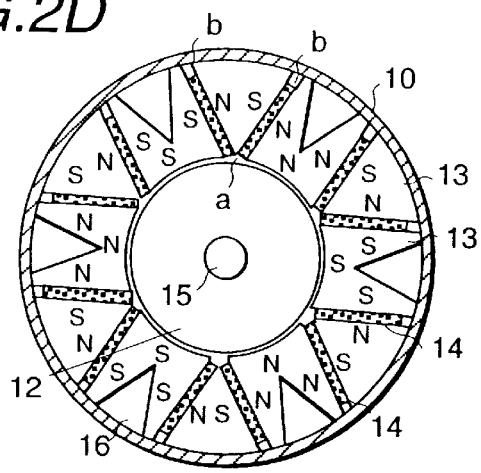
Figure 2B:
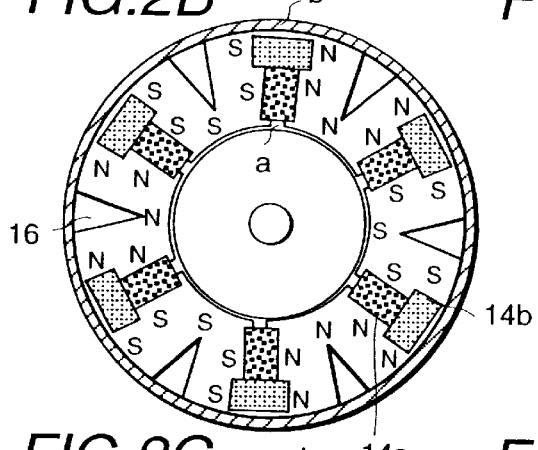
Figure 2E:
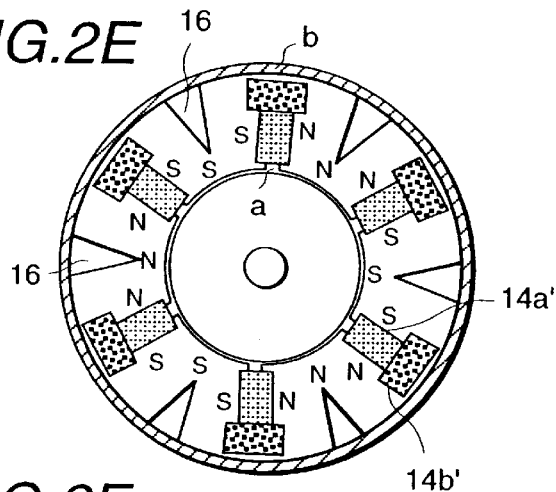
Figure 2C:
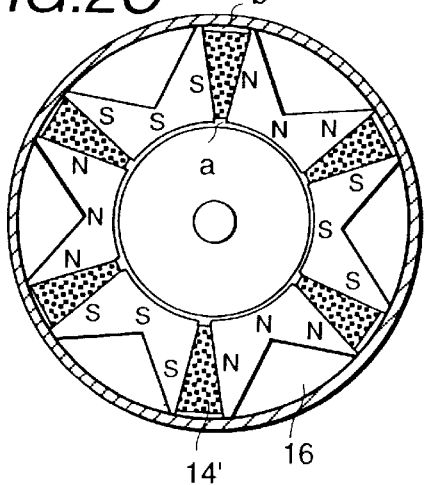

FIG. 2B shows an example in which the magnets 14a and 14b having the different strength are inserted into the slit and this structure is effective to the change of the magnetic distribution of the air gap and the strength for the magnetic force. In FIG. 2C, the structure is effective to make homogeneously (constant) the magnetic flux distribution of the magnet type generator and a cross-section of the magnet 14' is a trapezoid form.

In FIG. 2D, the magnet 14 in which the magnet having the same strength is increased two (2) sheets per one magnetic pole and this structure is effective further to the magnetic force improvement of the air gap, accordingly the remarkable performance improvement of the magnet type generator can be expected. In FIG. 2E, two kinds magnets 14a' and 14b' are employed and a main magnet is the magnet 14a' and using this magnet 14a' the magnetic field of the air gap can be determined, further using the magnet 14b' a minute adjustment of the magnetic field can be carried out.

Figure 2F:
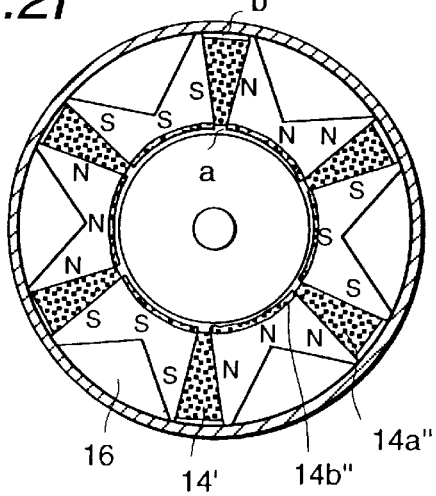

FIG. 2F is a construction example in which by combining the magnets 14a'' shown in FIG. 2C, for example, according to the present invention with the conventional cylindrical magnet 14b'' the strong air gap magnetic field of the magnet type generator can be expected.

It is effective to obtain the strong air gap magnetic flux by combining the weak magnetic flux magnet and when the axial direction length and the empty space etc. are combined, the magnet structure having the more strong and economic characteristics of the magnet type generator can be obtained.

Each of FIGS. 3A–3F shows an inner rotor and magnet type generator and this generator has a reversal structure of the outer rotor and magnet type generator as shown in FIGS. 2A–2F and basically since the structure shown in this embodiment is same to the structure shown in FIGS. 2A–2F, the explanation thereof will be omitted.

Figure 3A:
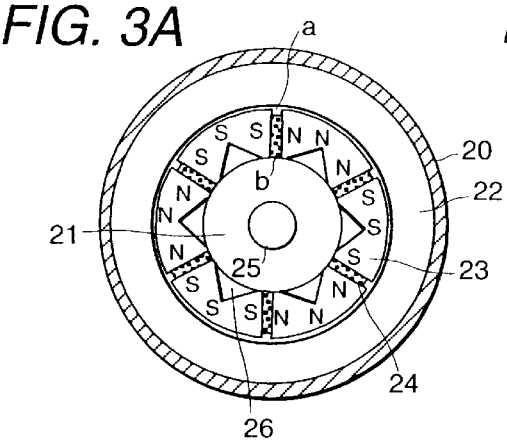
FIGS. 3A–3F are cross-sectional explanation views of a magnet type rotor of an inner rotor and magnet type generator and explanation views of the magnetic flux concentration of an air gap of six embodiments according to the present invention.

In FIG. 3A, the inner rotor and magnet type generator is constituted by a housing 20, a non-magnetic body holder 21, a stator 22, division iron cores 23, magnets 24, a shaft 25, and spaces 26.

Figure 3B:
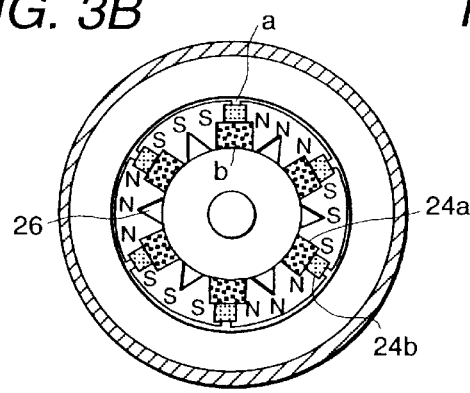
Figure 3C:
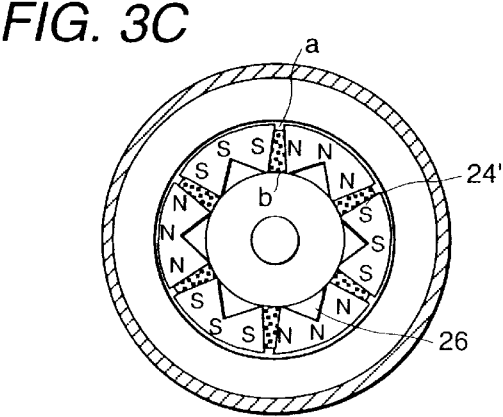
Figure 3D:
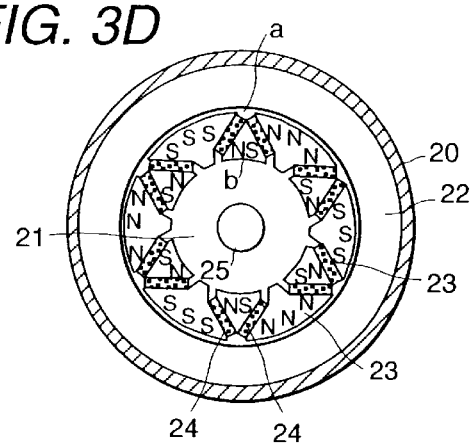
Figure 3E:
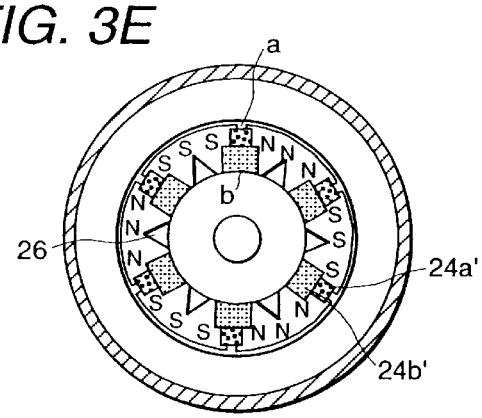
Figure 3F:
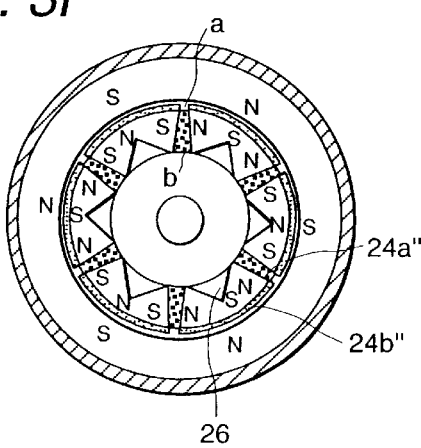

In FIG. 3B, the inner rotor and magnet type has magnets 24a and magnets 24b. In FIG. 3C, the inner rotor and magnet type has magnets 24'. In FIG. 3D, the inner rotor and magnet type has magnets 24. In FIG. 3E, the inner rotor and magnet type has magnets 24a' and magnets 24b'. In FIG. 3E, the inner rotor and magnet type has magnets 24a' and magnets 24b'. In FIG. 3F, the inner rotor and magnet type has magnets 24a'' and magnets 24b''.

Further, the above stated explanation is exemplified to the magnet type generator, however the same technique will be adopted naturally to the magnet type electric motor. Further, the principle of this magnetic force concentration obtained by the present invention can be adopted the every electric motor in which other magnets are used. For example, such an electric motor is a pancake type electric motor, a linear motor, and a magnet apparatus and machine, etc.

Figure 4A:
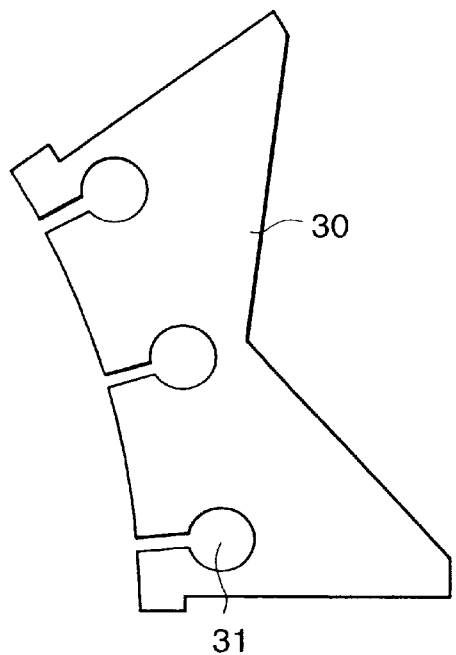
FIG. 4A is a plan view showing one embodiment of a division iron core structure of the magnet type rotor of the outer rotor and magnet type generator.

FIG. 4A is a plan view showing one example of a division iron core 30 of a rotor of an outer rotor and magnet type generator. Three slits 31 are provided facing to the stator and the air gap.

With this construction, in a case where the magnet rotor is used in a windmill type generator in which a synchronization electric motor and a thrust force type propeller, without use of a complicated and high cost electronic circuit, to able to activate by its own ability, it can form a cage type rotor and a winding type rotor which are used in a simple induction electric motor etc.

The activation is performed as a single phase or a multiphase induction electric motor. To increase the activation torque, the slit shape is changed variously, accordingly it is possible to correspond, for example a deep groove slit, according to the demands.

Figure 4B:
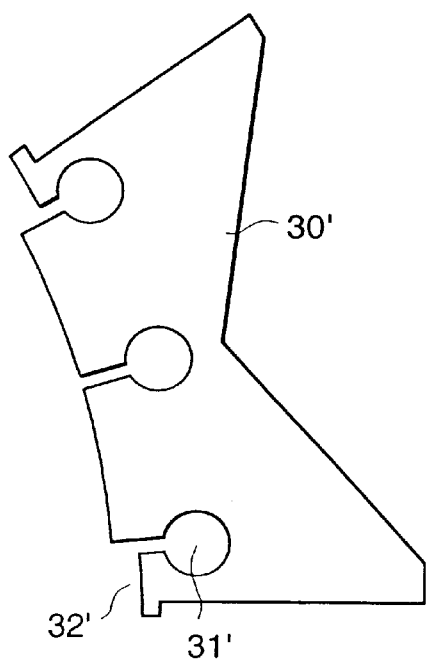
FIG. 4B is a plan view showing another embodiment of a division iron core structure of the magnet type rotor of the outer rotor and magnet type generator.

FIG. 4B is a plan view showing another example of a division iron core 30' of a rotor of an outer rotor and magnet type generator. Three slits 31' are provided facing to the stator and the air gap, and both ends of the iron core 30' are cut off and such cut-off portions are indicated by a numeral reference 32'. The generation of the magnetic flux of the air gap at these cut-off portions 32' can be lessened extremely. The reversal loss is exemplified by the eddy current loss etc. during the reversal time according to the alternation current which flows into the coil of the stator during the high rotation time, such a reversal loss can be attained by the simple cut-off form 32' of the iron core 30'. An electric angle of the cut-off portion 32' is requested by a following formula.

an electric angle=180°−{2π×phase number to be excited/(pole number of rotor×phase number of electric motor)} (degree)

Further, accompanying with the cut-off portions 32', with a ratio of 180°/(180−electric angle of cut-off portion) degree, it is possible to increase the magnetic flux density and without the large down of the characteristic, accordingly the loss can be down.

Namely, in the division iron core 30' with the magnet arrangement, a part of the magnetic pole is cut off, and according to the above stated electric angle of the cut-off portion 32', the conversion loss during the magnetic pole change-over time is reduced according to only the iron core structure 30'.

FIGS. 5A–5D show embodiments of the present invention in which using the structure shown in FIG. 4A a cage type rotor is formed to the outer rotor and magnet type generator.

This outer rotor and magnet type generator is constituted by an outer frame 10, a stator 12, division iron cores 13, magnets 14, a shaft 15, non-magnetic spaces 16, side plates 18, and bars 19.

Figure 5A:
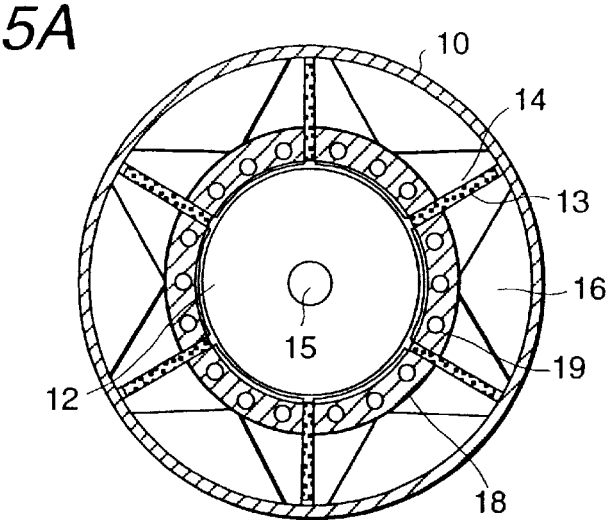
FIG. 5A is a cross-sectional view showing an example in which a cage type rotor portion of the outer rotor and magnet type generator is formed.
Figure 5B:
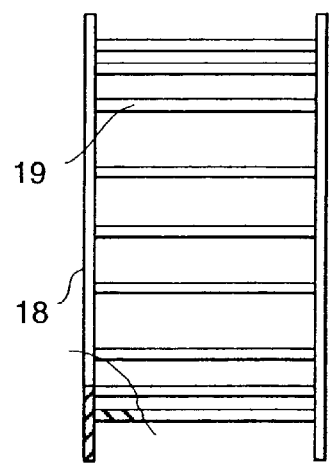
FIG. 5B is a plan view of a side plate and a bar of the cage type rotor portion of the outer rotor and magnet type generator of one embodiment according to the present invention.
Figure 5C:
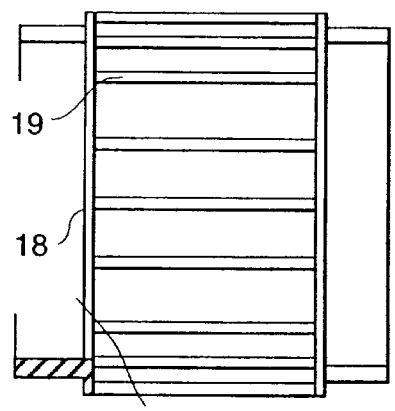
FIG. 5C is a plan view of a side plate and a bar of the cage type rotor portion of the outer rotor and magnet type generator of one embodiment according to the present invention.

The construction of a rotor portion of the cage type rotor is shown in FIG. 5B and FIG. 5C and this rotor portion is made of a conductive body such as aluminum and brass etc. One body construction of the rotor portion is formed using two side plates 18 and plural bars 19 according to the faucet processing manner and the die casting processing manner, etc.

The rotor bars 19 are formed by the skewing and then the activation characteristic of the cage type rotor can be improved, further the stator 12 is formed by the skewing and naturally it is possible to improve the activation characteristic.

In a case where the magnet 14 according to the present invention is extended to an axial direction, as shown in FIG. 5B, the iron core 13 is divided by the side plate 18. However, as shown in FIG. 5C, when the length to a radial direction of the side plates 18 is formed short to the utmost, a cross-sectional area of the side plate 18 is formed the same and the side plate 18 is extended to the axial direction and is arranged to an inner peripheral face of the division iron core 13 (in the case of the inner rotor type to an outer peripheral face).

Figure 5D:
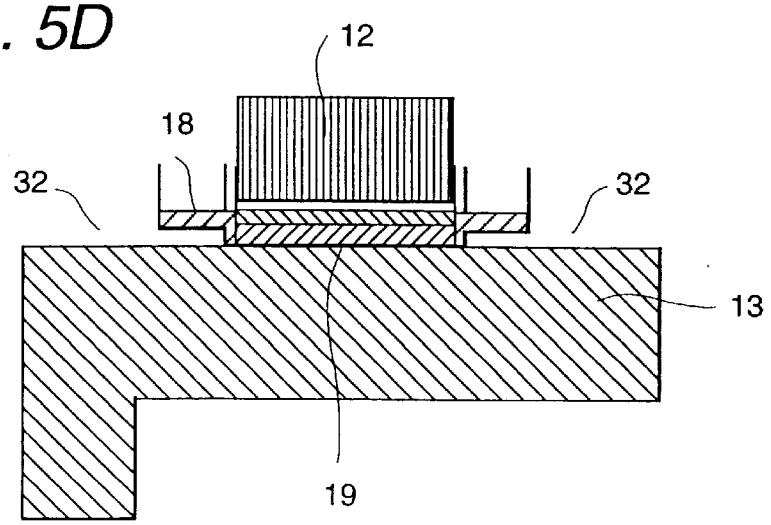
FIG. 5D is a cross-sectional view of a stator, an iron core, the side plate of the outer rotor and magnet type generator of one embodiment according to the present invention.

Further, to concentrate the magnetic flux from the magnet which is extended to both sides to the air gap, since the side plate 18 is arranged on step-wise portions 32 of the division iron core 13 shown in FIG. 5D which is provided to prevent the leakage from the end face of the stator 12, accordingly the affect to the magnetic path can be lessened.

Figure 6A:
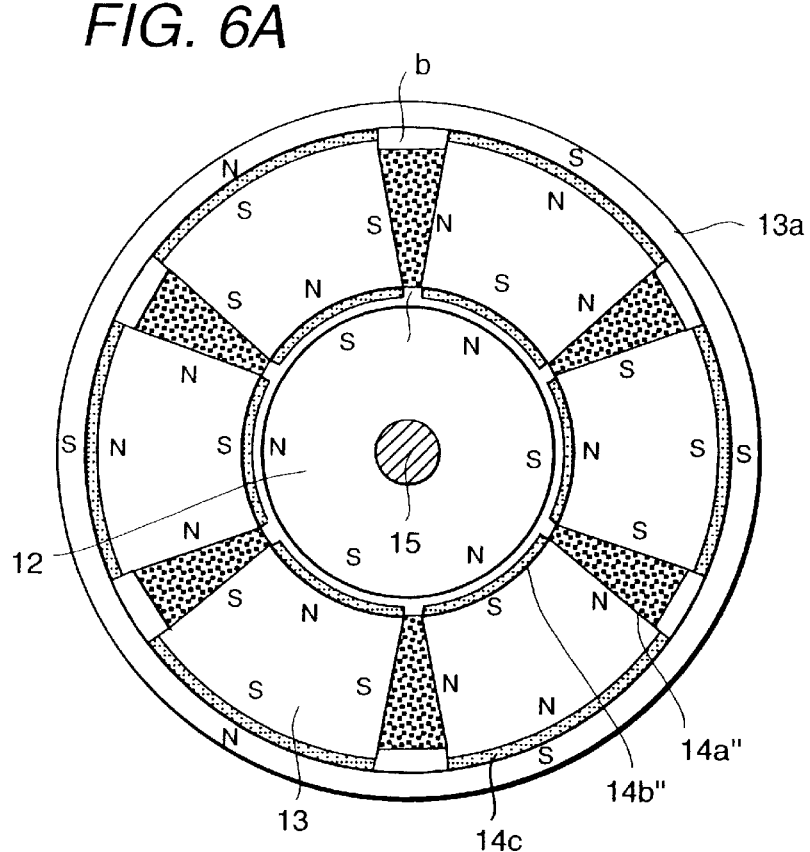
FIG. 6A is a cross-sectional view showing a magnet type generator, in which magnets are arranged at a whole of a three-dimensional face in a case where a magnetic pole space is limited, of one embodiment according to the present invention.
Figure 6B:
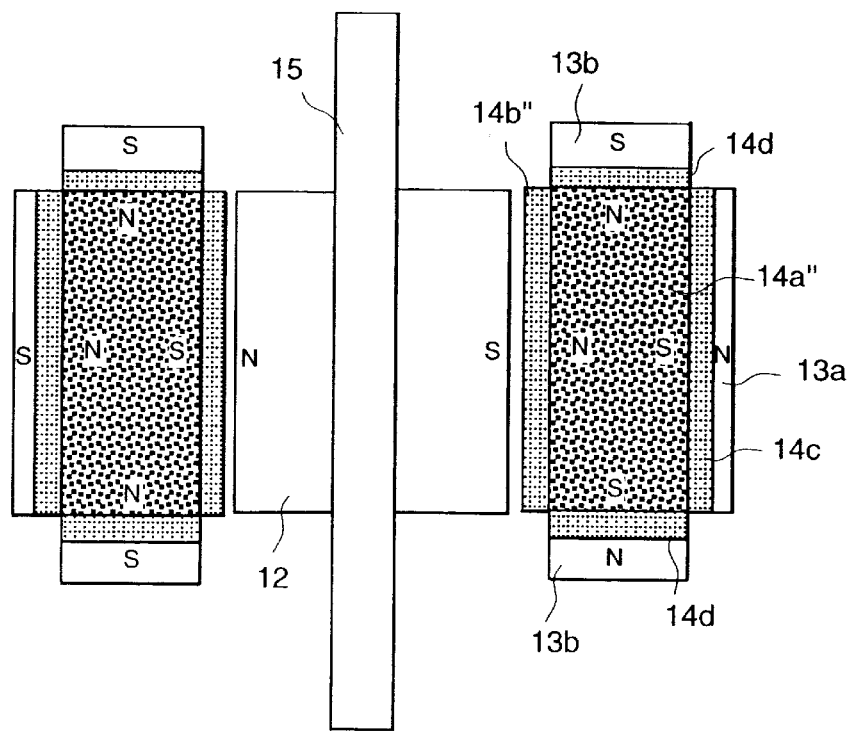
FIG. 6B is a cross-sectional view showing of the magnet type generator shown in FIG. 6A of one embodiment according to the present invention.

FIG. 6A and FIG. 6B are embodiments in which in a case where the space for arranging the magnetic pole is limited in the magnet type electric motor and the generator etc. as shown in the example of FIG. 2F, utilizing the limitation magnetic pole space the magnet is arranged organically at a whole or a part of the three-dimensional face, the magnetic flux is concentrated at the maximum.

The combination magnet can be formed with one body structure, when it is possible to be formed structurally on a part of thereof. For examples a magnet 14a″ shown in FIG. 2F and a magnet 14d, which is arranged to the axial direction at the magnetic pole, are formed with a ring shape and are formed with one body structure, accordingly the productivity of the magnet can be heightened.

Further, a magnet 14c or a magnet 14b″ are combined and they can be formed with a cap shape. The cylindrical shape magnet 14c is arranged to the outer peripheral portion of the magnetic pole, and at this outer periphery an iron core 13a for forming the magnetic path of the magnetic flux is arranged. Further, at an outer side of the magnet 14d an iron core 13b is arranged, and then the magnet 14d can work effectively to flow the magnetic flux.

The polarities of all of these magnets are set and are arranged in N, S as shown in FIG. 6A to concentrate the magnetic flux to all of the air gaps. Further, to the respective magnet it is carried out naturally that the non-magnetic space is provided suitably to make the short circuit and the magnetic flux and the leakage at the minimum.

As explained in above, the present invention can provide a technique in which the shape of the magnet and the iron core of the magnet type rotor of the magnet type electric motor and generator and, in particular in accordance with the axial direction size and the arrangement and further the structure etc. of the magnets, the magnetic flux of the air gap can be improved remarkably and the performance and the efficiency of the magnet type electric motor and generator can be improved remarkably.

Further, in particular in the case of a small type apparatus and machine in which the outer appearance shape is limited and the arrangement and the space of the magnetic pole are limited, etc., using the ferrite magnet etc. having the low cost and the plenty in the resource, the epoch-making technique of the economical magnet type electric motor and generator.

According to the present invention, in the magnet type electric motor and generator, the performance and the efficiency having the strong magnetic flux magnet represented by the earth metal magnet such as neodymium etc. can be attained.

What is claimed is:

1. A permanent-magnet electric motor or a permanent-magnet generator, comprising;

a stator;

a rotor, facing said stator, and with an air gap between the rotor and the stator, the rotor comprising plural iron cores and plural permanent magnets; and plural radial slits provided between adjacent iron cores of said plural iron cores, the plural permanent magnets being inserted in said plural radial slits, wherein:

said plural iron cores are completely separated from each other, each of said plural iron cores having a same shape, and each of said plural iron cores having independently a magnetic pole, and on a whole of a face, of a respective iron core of said plural iron cores, a permanent magnet of said plural permanent magnets is arranged.

2. A permanent-magnet electric motor or a permanent-magnet generator according to claim 1, wherein the stator and rotor have a common axis, with one of the stator and rotor surrounding the other of the stator and rotor, wherein said plural radial slits extend in a radial direction with respect to said common axis, and wherein at least one permanent magnet of said plural permanent magnets, extends in said radial direction along the face of the respective magnetic pole.

3. A permanent-magnet electric motor or permanent-magnet generator according to claim 2, wherein the rotor extends beyond the stator in the direction of the common axis.

4. A permanent-magnet electric motor or permanent-magnet generator according to claim 1, wherein the plural iron cores and plural permanent magnets are positioned so as to concentrate magnetic flux at said air gap.

5. A permanent-magnet electric motor or a permanent-magnet generator, comprising:

a stator;

a rotor, facing said stator, and with an air gap between the rotor and the stator, the rotor comprising plural iron cores and plural permanent magnets; and plural radial slits provided between adjacent iron cores of said plural iron cores, the plural permanent magnets being inserted in said plural radial slits, wherein:

said plural iron cores are completely separated from each other, each of said plural iron cores having a same shape, and each of said plural iron cores having independently a magnetic pole, the stator and the rotor extend in an axial direction, and a length, in the axial direction, of said plural iron cores of the rotor, is larger than a length, in said axial direction, of said stator; and on a whole of a face of each respective magnetic pole of said plural iron cores, except for two side faces, said plural permanent magnets are arranged.

6. A permanent-magnet electric motor or a permanent-magnet generator according to claim 5, wherein the iron core projects beyond the stator in the axial direction.

7. A permanent-magnet electric motor or permanent-magnet generator according to claim 5, wherein the plural iron cores and plural permanent magnets are positioned so as to concentrate magnetic flux at said air gap.

* * * * *